B. F. FIELD.
Potato-Planter.
No. 50,202. Patented Sept. 26, 1865.
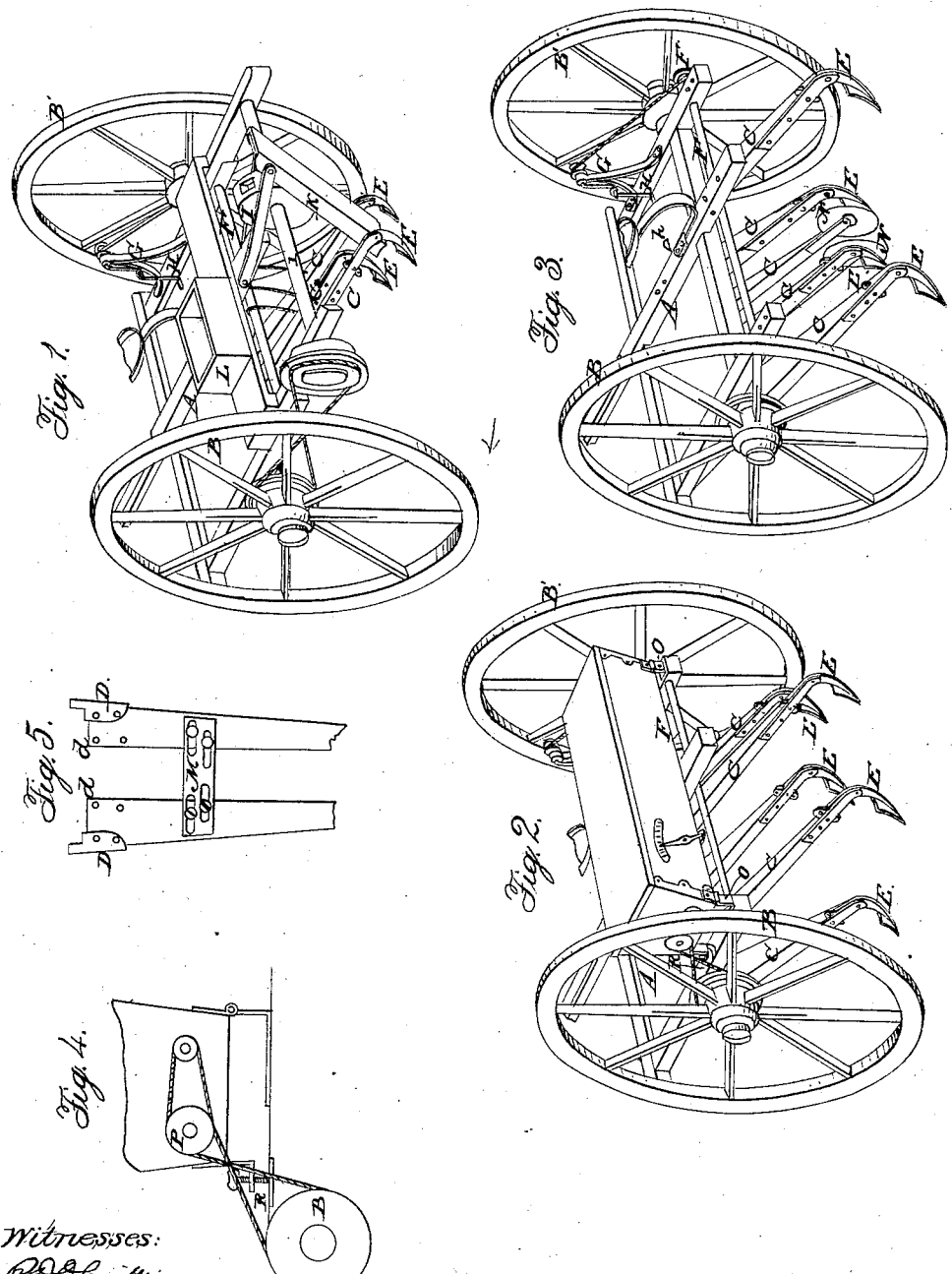
Witnesses:
Inventor:
B. F. Field

UNITED STATES PATENT OFFICE.

B. F. FIELD, OF SHEBOYGAN FALLS, WISCONSIN, ASSIGNOR TO HIMSELF AND E. T. BOND.

IMPROVEMENT IN COMBINED POTATO-PLANTER, SEEDER, AND CULTIVATOR.

Specification forming part of Letters Patent No. 50,202, dated September 26, 1865.

*To all whom it may concern:*

Be it known that I, B. F. FIELD, of Sheboygan Falls, in the county of Sheboygan and State of Wisconsin, have invented an Improved Combined Machine for Planting Potatoes, Broadcast or Drill Seeding, and Cultivating; and I do hereby declare the following to be a full, clear, and exact description of the same, reference being had to the accompanying drawings, in which—

Figure 1 is a perspective view of my machine as used for planting potatoes. Fig. 2 is a perspective view of the same as used for seeding. Fig. 3 is a perepective view of the same as used for cultivating. Fig. 4 is an elevation of the end of my seed-hopper, showing my method of regulating the tension of the belt. Fig. 5 is a plan of the shield drag-bars, showing my plan of adjusting and attaching them.

The nature of my invention will be best understood by the following description of its construction and operation.

I will first describe those parts of my machine which are common to all the designated uses for the machine.

A is the frame or body, constructed in any of the usual ways.

B B' are the bearing-wheels.

C C are the drag-bars, constructed of strips of suitable stuff cut wider at one end than at the other, and the wide end cut across at right angles to one of the edges, as seen at $d$, Fig. 5. Of these drag-bars, five is the usual number; and I make two of the five somewhat longer than the other three, so that the cultivator-teeth attached to those two may be in rear of the other teeth, the necessity for which arrangement will appear when describing the special uses of my machine.

Upon the under side of the front cross-bar of the frame of the machine I place a number of eyebolts or staples, and through them I place a rod, to which the drag-bars are attached. Upon the wide ends of the drag-bars are the metallic ears or lugs D, through projections of which are holes for the rod attaching them to the machine. When the drag-bars are in place upon the drag-rod, one of the staples or eyes spoken of is then between each pair of the drag-bars, so that they are confined and not able to move sidewise upon the rod.

The rear or narrow ends of the drag-bars are faced on either edge by strips of iron, which are secured by screws or bolts, and extend beyond the end of the wood some distance to receive between them the cultivator-tooth E, which is pivoted to the outer end of the drag-bar. The cultivator-tooth has a shank bent forward at at its upper end so as to be in general direction at right angles to the tooth itself. It is pivoted to the drag-bar at the angle or elbow of the shank, and is kept from turning upon that bolt by means of a wooden pin placed through a hole through the drag-bar and shank of the tooth, so that if the tooth comes in contact with any unyielding substance the pin will break rather than the tooth.

In order to raise the cultivators from the ground when going to or form the field and in turning at the end of the row, I use a windlass, F, in the ordinary manner, and prefer to actuate it by a crank, G, and cords or chains, so that it may be convenient to the hand while riding on the machine. To hold the crank from turning back, where cultivators have been raised, I provide the stop H, which is composed of a rod having a hooked end to catch the handle of the crank and a spring-bar, to which said rod is attached, so that when the foot is placed upon the pin $h$ the spring-bar and stop are pressed down and out of the way of the crank, and when the foot is removed the stop will ascend and catch the handle of the crank, as shown.

When my machine is to be used as potato-planter I attach to the rear of the frame A a small supplementary frame bearing a shaft, $i$, with a seed-wheel, I, and pulley J. In rear of the seed-wheel, and partly inclosing it, I place the chute K, which is attached to the machine in any suitable way. The lower end of the chute K inclines forward and reaches nearly to the ground in rear of the center cultivator-tooth. A seed-box, L, is placed in a convenient position upon the machine. I then remove two of the short drag-bars and transpose the two long ones, so that their straight edges shall come toward the center. I then have one cultivator-tooth in the center to open the furrow; immediately behind it the chute K to convey the seed into the furrow, and following that two cultivator-teeth to cover the seed, all of which is clearly shown in Fig. 1.

In order to economize material and to make my machine more convenient, I construct my center drag-bar in two pieces, as shown in Fig. 5, and connect them together by the plate M. I am then enabled to bring their rear ends together for the purpose of attaching a cultivator-tooth, as shown in Figs. 1 and 2; or I can separate them for the purpose of attaching the revolving corn-shields shown at N, Fig. 3, to be hereinafter described. This change is effected by simply loosening the screws through the slots in the plate M, and then bringing the rear ends of the bars together.

In operation as a potato-planter a person is required to sit beside the box L, and as the feed-wheel is revolved, by a belt from the pulley of the driving-wheel B over the pulley J, the seed is placed in each cell successively, and from them it is dropped into the chute at regular intervals; and is properly deposited in the furrow and covered.

In actual practice I have found this manner of planting potatoes to be exceedingly expeditious and reliable.

When arranged as a seed-sower the supplementary frame is removed and the other two drag-bars are placed upon the machine, the two long ones being transposed from their last positions, so as to bring their straight edges outward. My seed-hopper is then mounted upon the rear of the machine upon the hinges O, so that when I desire to empty it of seed or to clean the inside the box may be turned backward upon said hinges and entirely inverted. A belt from the driving-wheel pulley to the pulley P drives the agitators, and as this belt is continually liable to a change of tension, owing to variations of temperature and moisture of the atmosphere, I have placed set-screws R under the front edge of the seed-hopper, so that by raising or lowering said front edge of the hopper, by means of the screw, the agitator-belt may be relaxed or tightened at pleasure.

When my machine is to be used for the cultivation of corn or other crops planted in drills or hills the seed-hopper is to be removed, the center tooth taken out, the center drag-bar separated, and the two revolving-shields N N are to be attached to the separate parts of the same. The two short drag-bars must be placed next the center, so that their teeth are beside the shields, and the machine is ready for use. If the rows of plants be very straight the shields may be set quite near together, and as they roll along the ground effectually protect the plants from being broken or injured by clods thrown over by the cultivator-teeth.

The drag-bars may be moved upon the drag-rod, so as to bring them nearer together or farther apart, as required, by placing them, with the eyebolts or staples between the ears or lugs D by the use of washers, or by transposing them so as to bring the straight edges on the opposite side, &c.

From this description it will be seen that I have produced a machine which, with very slight changes or substitution of parts, may be converted, as described, into three efficient and convenient machines.

Having now described my invention, what I claim as new, and desire to secure by Letters Patent, is—

1. The combination and arrangement of the feed-wheel I, chute K, and cultivator-teeth E E E, substantially as shown and described, and for the purpose set forth.

2. The combination and arrangement, in a seeding-machine, of the pulleys B and P and the set-screw R, for the purpose of regulating the tension of the belt, substantially as set forth.

3. The compound drag-bar formed of the two parts d d, Fig. 5, connected by the slotted plate M, substantially as and for the purpose set forth.

4. The stop H, arranged and operated as described, and for the purpose set forth.

B. F. FIELD.

Witnesses:
R. D. O. SMITH,
AUGS. JORDAN.